United States Patent
Aguglia

(10) Patent No.: US 12,512,693 B2
(45) Date of Patent: Dec. 30, 2025

(54) ELECTRONIC ADAPTATION UNIT CONFIGURED TO ADAPT ELECTRICAL ENERGY STORAGE DEVICES TO DEVICES FOR CONVERTING FROM DIRECT CURRENT TO ALTERNATING CURRENT AND RELATIVE OPERATING METHOD

(71) Applicant: SIC Divisione Elettronica S.r.l.u., Lecce (IT)

(72) Inventor: Jorge Miguel Aguglia, Lecce (IT)

(73) Assignee: SIC DIVISIONE ELETTRONICA S.R.L.U., Lecce (IT)

( * ) Notice: Subject to any disclaimer, the term of this patent is extended or adjusted under 35 U.S.C. 154(b) by 0 days.

(21) Appl. No.: 18/863,889

(22) PCT Filed: May 9, 2023

(86) PCT No.: PCT/IB2023/054778
§ 371 (c)(1),
(2) Date: Nov. 7, 2024

(87) PCT Pub. No.: WO2023/218336
PCT Pub. Date: Nov. 16, 2023

(65) Prior Publication Data
US 2025/0300486 A1    Sep. 25, 2025

(30) Foreign Application Priority Data

May 9, 2022    (IT) .......................... 102022000009482

(51) Int. Cl.
*H02J 7/35*    (2006.01)
*H03K 3/017*    (2006.01)

(52) U.S. Cl.
CPC ................ *H02J 7/35* (2013.01); *H03K 3/017* (2013.01); *H02J 2207/20* (2020.01)

(58) Field of Classification Search
CPC ......... H02J 7/35; H02J 2220/20; H03K 3/012
See application file for complete search history.

(56) References Cited

U.S. PATENT DOCUMENTS

2020/0195159 A1    6/2020    Krzywinski et al.

FOREIGN PATENT DOCUMENTS

GB            2541431 A    2/2017
WO      2021/260522 A1    12/2021

OTHER PUBLICATIONS

International Search Report and Written Opinion issued for corresponding PCT International Application No. PCT/EP2023/054778 on Jul. 14, 2023.

*Primary Examiner* — Robert L Deberadinis
(74) *Attorney, Agent, or Firm* — Howson & Howson LLP

(57) ABSTRACT

An electronic adaptation unit comprises a power limiting circuit connectable by way of a first input to a storage device, a feedback circuit, and a sensor connectable by way of a first output to an inverter. The sensor comprises an input connected to the power limiting circuit and a second output connected to the feedback circuit, and is configured to measure the instantaneous electrical energy which passes through it and to transmit, towards the feedback circuit through the second output, a measured value, proportional to the instantaneous electric energy passing through it. The feedback circuit is connected at the output to a second input of the power limiting circuit and is configured to drive the power limiting circuit according to the measured value, by simulating the behavior of a solar panel system or of a set of photovoltaic solar panels. A system and operation method are also provided.

13 Claims, 4 Drawing Sheets

ELECTRONIC ADAPTATION UNIT CONFIGURED TO ADAPT ELECTRICAL ENERGY STORAGE DEVICES TO DEVICES FOR CONVERTING FROM DIRECT CURRENT TO ALTERNATING CURRENT AND RELATIVE OPERATING METHOD

TECHNICAL FIELD

Present invention relates, in general, to an electronic adaptation unit configured to adapt electrical energy storage devices to alternating current converter devices, commonly known as inverter devices.

Present invention also relates to a system comprising the electronic adaptation unit and to an operating method of the above electronic adaptation unit.

In particular, the present invention relates to an electronic adaptation unit configured to be interposed at least between electrical energy storage devices and inverter devices of known type.

BACKGROUND ART

Electrical energy storage devices are known such as, for example, storage devices configured to supply electrical energy by way of direct current.

Inverter devices are also known, preferably referred to hereinafter as inverters, configured to convert electrical energy from direct current to alternating current.

Known type inverters are preferably designed to operate connected directly to devices configured to supply direct current electrical energy from renewable sources such as for example solar panel systems of photovoltaic type.
In particular, it is known that inverters can be easily connected to solar panel systems since their production of photovoltaic current depends in a substantially linear way on the characteristics of the panels and on the amount of solar radiation received by the panels.

It is also known that storage devices are suitable for supplying electrical energy with very high peak currents, even if for limited times, so that the dimensioning of an inverter to be connected to a storage device must be carried out by taking into account in a very accurate way of the installed storage device in order to avoid malfunctions and breakages of the inverter.

In particular, according to the prior art, an inverter to be connected to a storage device must be sized so as to be compatible with the storage device in order to avoid malfunctions and breakages of the inverter.

A first problem of the prior art is that a storage device cannot be connected to any inverter but can only be connected to an inverter arranged to support the currents produced by the storage device, even if for limited times.

A second problem, connected to the first, is that, should the need arise to apply, for example, a new storage device to a solar panel system of photovoltaic type, previously directly connected to an inverter, it becomes, in general, necessary to replace the inverter with an inverter arranged to support the peak currents provided by the new storage device.

In general, therefore, the possible need to apply, in accordance with the prior art, a storage device to devices configured to supply direct current electricity from renewable sources requires to replace the inverter, if such devices are already directly connected to an inverter.

Even more in general, the known art shows the problem, in case of connection of an inverter to a storage device, of providing to configure the inverter according to the characteristics of the storage device.

In summary, Applicant has noted that the connection of storage devices to inverters generally requires, in accordance with the prior art, a specific configuration of the inverters in such a way to provide that they are compatible with the expected or expectable storage devices.

DISCLOSURE OF THE INVENTION

The object of the present invention is thus to solve the known art problems outlined above.

Such an object is achieved by way of the electronic adaptation unit configured to adapt electrical energy storage devices to devices for converting direct current to alternating current (inverters) as claimed.

The present invention also relates to an operating method of the above electronic adaptation unit.

The following summary of the invention is provided in order to provide a basic understanding of some aspects and features of the invention.

This summary is not an extensive overview of the invention, and as such it is not intended to particularly identify key or critical elements of the invention, or to delineate the scope of the invention. Its sole purpose is to present some concepts of the invention in a simplified form as a prelude to the more detailed description that is presented below.

According to a feature of a preferred embodiment, the electronic adaptation unit is configured so as to simulate (mime) the behavior of a solar panel system of photovoltaic type or of a set of photovoltaic panels, by making the inverter characteristics independent from the characteristics of the storage device.

In general, the electronic adaptation unit, according to the present invention, is configured so as to allow that any storage device may be connected to any inverter.

In particular, in case of application of an electronic adaptation unit to a solar panel system or to a set of photovoltaic solar panels, the electronic adaptation unit is configured so as to duplicate the electrical characteristics of the solar panel system or of the set of photovoltaic solar panels in order to simulate, by way of a power limiting circuit and one or more systems of feedback and measurement of the currents passing through it, the behavior of the solar panel system or of the set of photovoltaic solar panels without requiring the replacement of the inverter.

According to a further feature of the present invention, the adaptation unit comprises a power limiting circuit, which can be connected by way of a first input to the storage device, a feedback circuit and a sensor, which can be connected to a first output to the inverter; the sensor is connected in input to the power limiting circuit and by way of a second output to the feedback circuit, and is configured to measure the instantaneous electrical energy passing through it and transmit a measured value towards the feedback circuit, by way of the second output, proportional to the instantaneous electrical energy passing through it; the feedback circuit is connected at the output to a second input of the power limiting circuit and is configured to drive the power limiting circuit according to the measured value, by simulating the behavior of a solar panel system or of a set of photovoltaic solar panels.

According to another feature of the present invention, the adaptation unit comprises a power limiting circuit comprising a "buck converter" type circuit, connectable by way of a first input to the storage device, a feedback circuit and a sensor, connectable by way of a first output to the inverter;

the sensor comprises an input connected to the power limiting circuit and a second output to the feedback circuit, and comprises a passive current transformer; the feedback circuit is connected to a second input of the power limiting circuit and comprises a digital microprocessor circuit programmed to process the current transformer signal and generate a PWM signal at the output capable of controlling the "buck converter" type circuit, comprised in the power limiting circuit, to generate a variable voltage output within predefined limits, according to the driving operated by the PWM signal, so as to simulate the behavior of a solar panel system or of a set of photovoltaic solar panels.

BRIEF DESCRIPTION OF DRAWINGS

These and further features and advantages of the present invention will appear more clearly from the following detailed description of preferred embodiments, provided by way of non-limiting examples with reference to the attached drawings, in which components designated by same or similar reference numerals indicate components having same or similar functionality and construction and wherein.

Within this description it is provided that the figures are not necessarily to scale and that terms such as: upper, lower, longitudinal, orthogonal, lateral, above, below, etc. are used in their conventional meaning unless otherwise suggested.

BEST MODES FOR CARRYING OUT THE INVENTION

Figure 1:
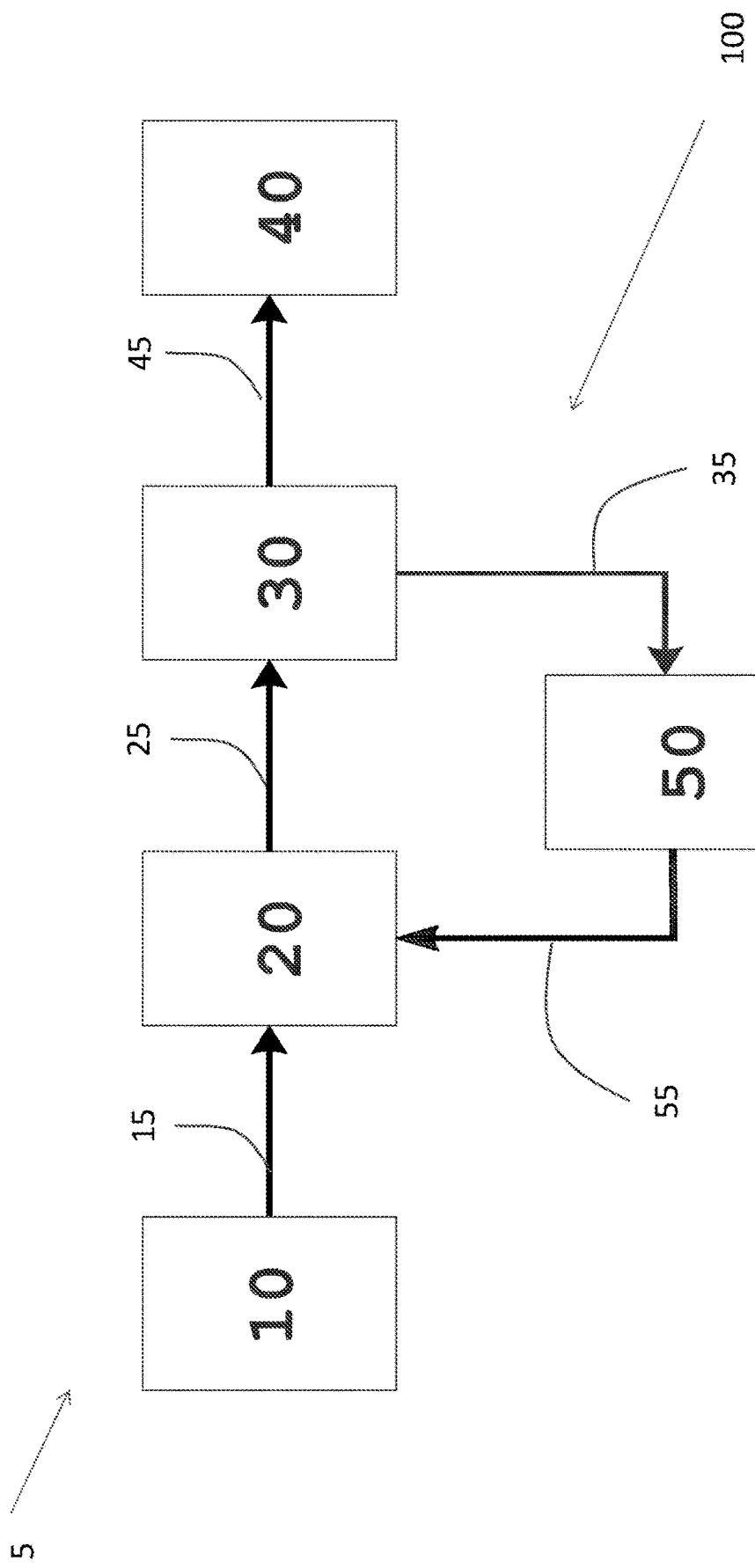
FIG. 1 shows a block diagram of a system comprising a general example of an electronic adaptation unit made according to the present invention.

With reference to FIG. 1, a block diagram of a system 5 is shown comprising, at least, a storage device 10, an inverter 40 and an electronic adaptation unit 100 made according to a first general embodiment example.

According to this first general embodiment example, the electronic adaptation unit 100, hereinafter referred to preferably as adaptation unit, comprises a power limiting circuit 20, a feedback circuit 50 and a sensor 30.

In particular, the power limiting circuit 20 comprises a first input 15, connected to the storage device 10, for example an accumulator or a battery, and a second input 55 connected to an output of the feedback circuit 50, and the sensor 30 comprises an input 25, connected to an output of the power limiting circuit 20, and a first output 45, connected to the inverter 40, and a second output 35, connected to the feedback circuit 50.

According to this embodiment, it is provided, in general, that the adaptation unit 100 draws the electrical energy in input from the storage device 10 and supplies it in output to the inverter 40, in a suitably limited quantity by way of the adaptation unit 100.

In particular, the sensor 30 of the adaptation unit 100 measures the instantaneous electrical energy transmitted to the inverter 40 and transmits, at the output, towards the feedback circuit 50, a measured value proportional to the instantaneous electrical energy which passes through it.

The feedback circuit 50, depending on the measured value received from the sensor 30, drives the power limiting circuit 20 so as to simulate the behavior of a solar panel system or of a set of photovoltaic solar panels.

Even more in particular, the feedback circuit 50 reduces the instantaneous energy output from the adaptation unit 100, the higher the current measured by the sensor 30 is.

In general, the adaptation unit 100, as disclosed, obtains the effect of limiting the energy supplied by the storage device 10 in a way similar to the intrinsic limitation of the solar production, by making the storage device 10 compatible with any inverter 40 provided, for example, for a solar panel system of photovoltaic-type.

According to a second embodiment, the adaptation unit 100 comprises, interposed between the output 55 of the feedback circuit 50 and the power limiting circuit 20, a PWM (Pulse-Width Modulation) generator 51 (FIG. 2), for example the integrated circuit model UC3843 of the Texas Instruments Company.

According to this second embodiment, the power limiting circuit 20 comprises a "buck converter" type circuit, made in a known way as easily understandable by a person skilled in the art, and configured to be driven by the PWM generator 51.

In particular, the "buck converter" type circuit 20 is configured to generate a variable voltage output comprised between predefined limits, according to the driving operated by the PWM generator 51, so as to limit the power supplied by the storage apparatus 10.

For example, according to this embodiment, the sensor 30 comprises a current transformer of the passive type, for example the model CT100-16-05 by the Myenergi company, and the feedback circuit 50 comprises a voltage amplifier circuit configured so as to linearly amplify the signal of the current transformer 30, to limit the signal, and to make the signal able to drive the input of the PWM generator 51.

More particularly, the setting, as regards the voltage amplification and the signal limitation by way of the feedback circuit 50, is carried out, as easily understandable by a person skilled in the art, by suitably selecting one or more values of components comprised in the feedback circuit 50, such as for example the ohmic value of some resistors comprised in the feedback circuit.

Figure 3:
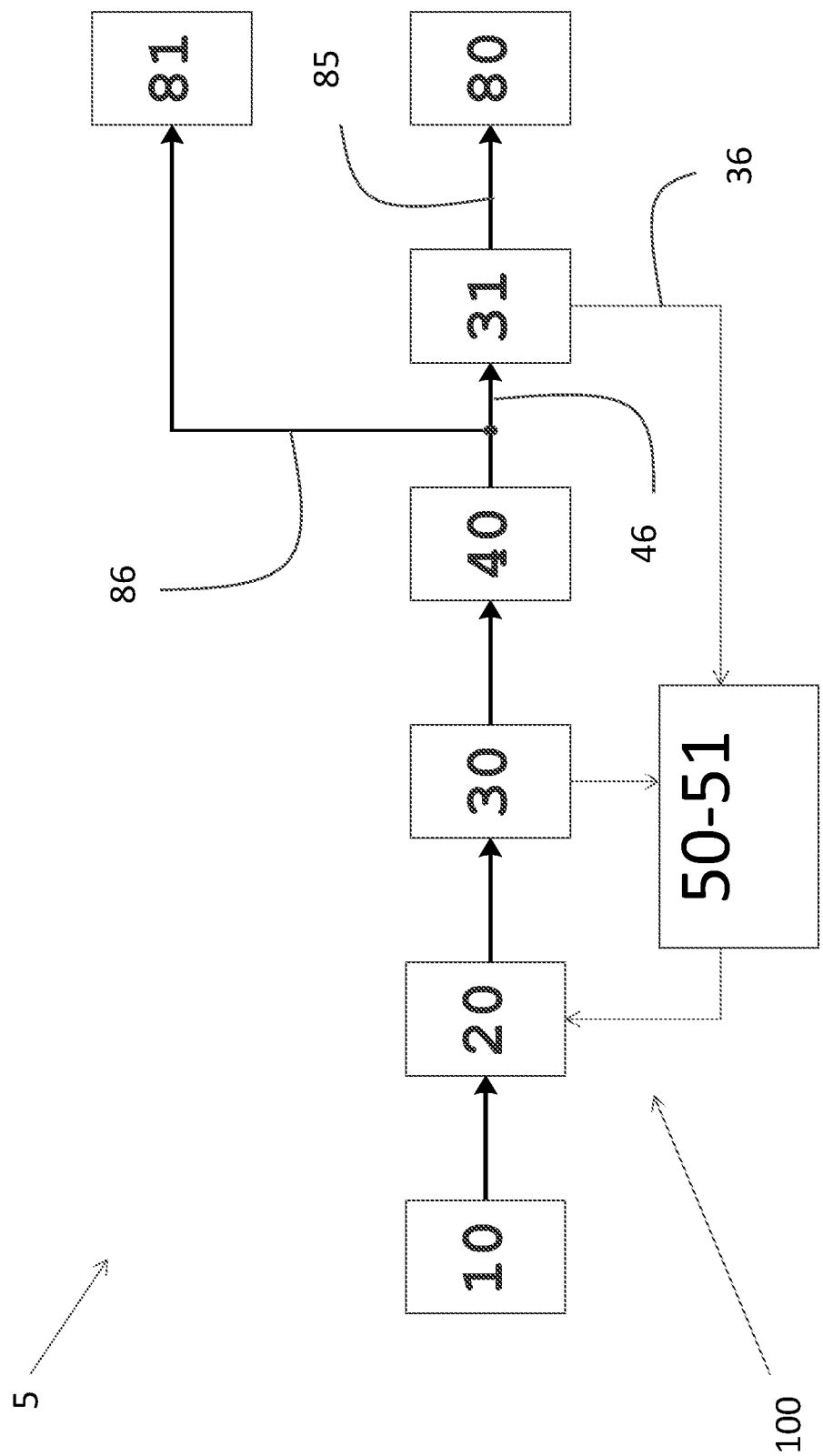
FIG. 3 shows a block diagram of a further system comprising a variant of the electronic adaptation unit of FIG. 1.

According to a further embodiment, FIG. 3 shows a further block diagram of a system 5 comprising the electronic adaptation unit 100.

According to this embodiment, it is provided that the system 5 comprises at the output, in addition to the inverter 40, also a public electrical network 80 and a domestic network 81.

Figure 2:
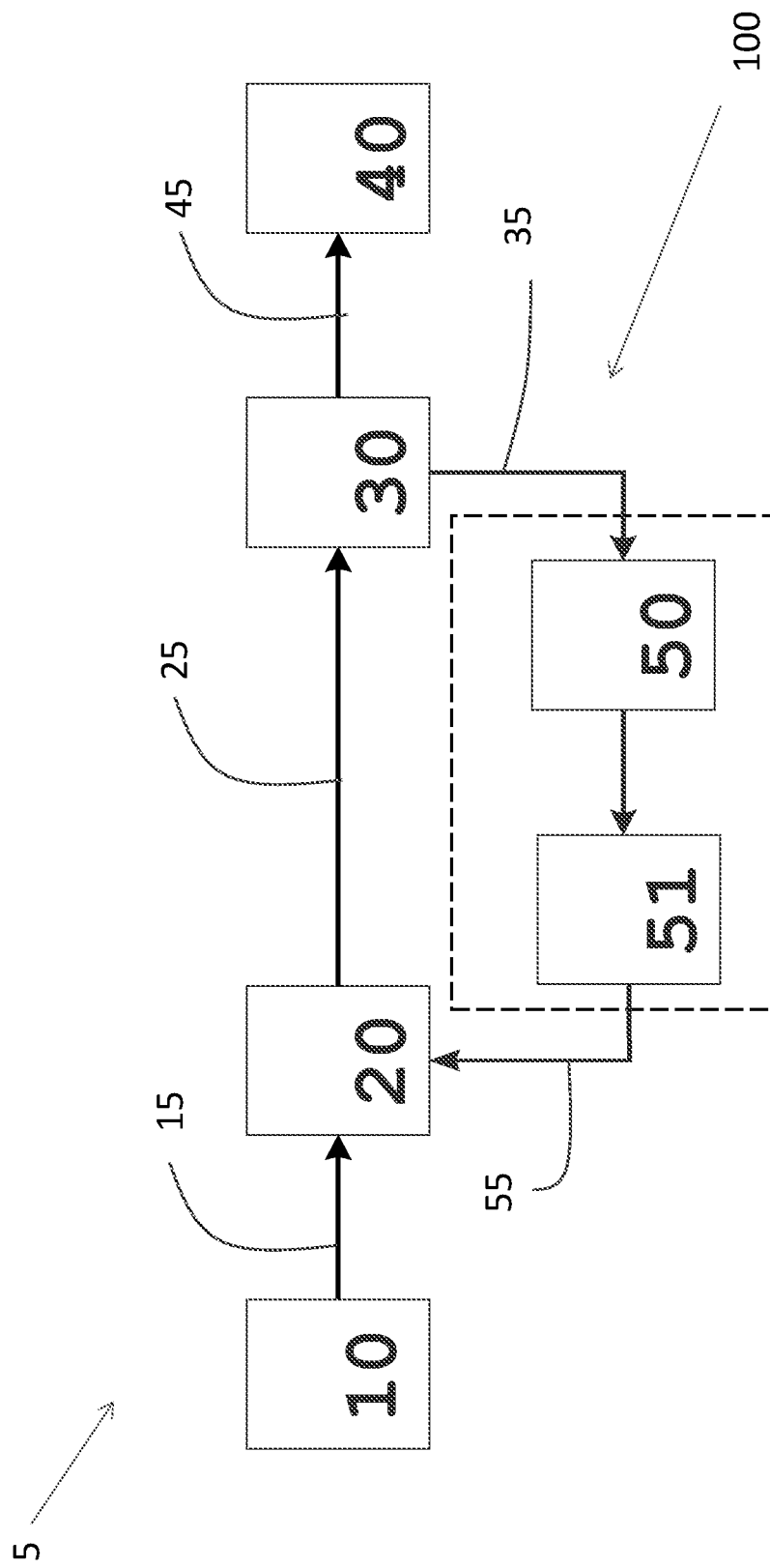
FIG. 2 shows a second block diagram of a system comprising a second example of an electronic adaptation unit made according to the present invention.

In particular, according to this embodiment, without prejudice to the connections already disclosed and shown in FIGS. 1 and 2, it is provided that the inverter 40 is connected by way of a first output 86 to the domestic network 81 and by way of a second output 46 to a second sensor 31 which is in turn connected by way of a first output 85 to the public electrical network 80 and by way of a second output 36 to the feedback circuit 50.

More in particular, according to this embodiment, the second sensor 31 is configured so as to measure the amount of electrical energy transferred to the public electrical network 80.

For example, the second sensor 31, of known type, is configured so as to measure the current, voltage and phase of the electrical energy and to report the value and direction of the measured electrical energy at the output of the feedback circuit 50.

According to this embodiment, it is provided that the feedback circuit 50 still comprises the PWM generator 51 and is implemented, for example, by way of a suitably programmed digital microprocessor circuit, for example a 32-bit microprocessor model STM32f103 of the company S.T., programmed to combine the data arriving from the first sensor 30 and those arriving from the second sensor 31 and to supply them to the PWM generator 51 configured for limiting the power provided to the power limiting circuit 20, for example to the "buck converter" type circuit.

Preferably it is provided that the values of the signals arriving from the sensors 30 and 31 are processed by the software memorized in the microprocessor by way of suitable pre-set parameters.

In any case, nothing prevents the feedback circuit from comprising one or more voltage amplifier circuits and a PWM generator.

This further embodiment is preferably provided in case of a need to control the quantity of electrical energy to be transferred to the public network and to balance in a predefined manner the energy to be dedicated to the public electrical network 80 and to the domestic network 81, for example by favoring the quantity of energy to be dedicated to the domestic network 81 compared to that to be dedicated to the public electrical network 80.

Figure 4:
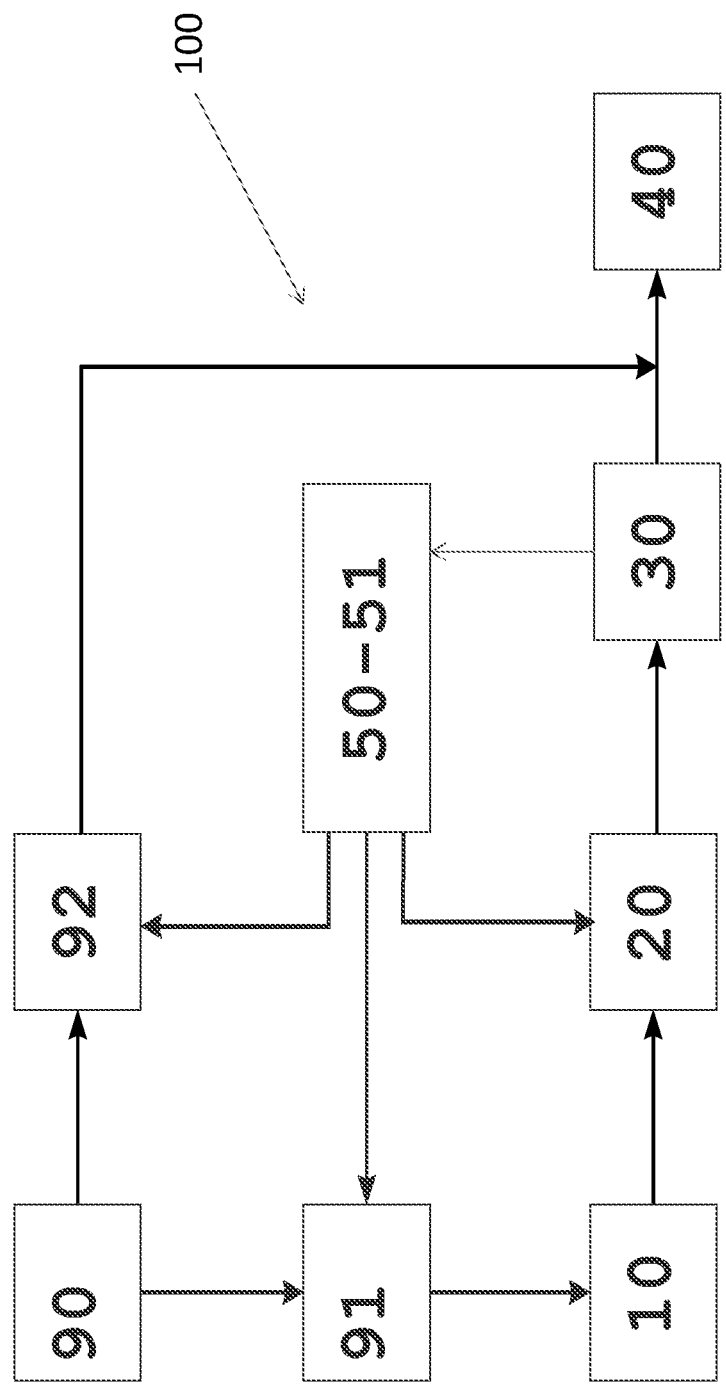
FIG. 4 shows a block diagram of another system comprising a further variant of the electronic adaptation unit of FIG. 1.

According to another embodiment, FIG. 4 shows a block diagram of the system 5 further comprising an apparatus 90, configured to supply direct current electrical energy from renewable sources, such as for example a solar panel system of photovoltaic type, to which reference is made hereinafter for simplicity of description.

The electronic adaptation unit 100, in the preferred embodiment, is configured so as to be powered with voltages compatible with those of the apparatus 90 and of the storage apparatus 10 and to power the inverter 40 with the same compatible voltages so that all the voltages can be superimposed on each other, without conversions.

Without prejudice to the connections already disclosed and represented in FIGS. 1 and 2, the solar panel system 90, for example, is connected at the output, both to an accumulation apparatus 10, by way of a battery charger circuit 91, and to the inverter 40 by way of a bypass circuit 92.

According to this embodiment it is provided that the feedback circuit 50-51, still comprising the PWM generator, preferably comprises a digital microprocessor circuit as for example disclosed in the example of FIG. 3.

In particular, according to this embodiment it is provided that the feedback circuit 50-51, in addition to generating the PWM signal, as disclosed in the example of FIG. 3, manages the charging phase of the storage apparatus by controlling, for example, the battery charger circuit 91 and manages the intervention of the bypass circuit 92.

The intervention of the bypass circuit 92 is provided, for example, when the accumulation apparatus 10 is fully charged and therefore, the solar panel system can be connected directly to the inverter 40.

The presence of the bypass circuit 92 allows the electronic adaptation unit 100 to independently power the inverter 40 by using the energy arriving from the apparatus 90, even in the event of a complete charge of the storage device 10.

The intervention of the battery charger circuit 91 is useful, for example, in case the storage device 10 is discharged.

The presence of the battery charger circuit 91 allows the electronic unit 100 to independently charge the storage device 10 regardless of the energy drawn by the inverter 40, so that, being independent the charge and discharge of the accumulation apparatus 10, different usage strategies can be provided.

In this preferred embodiment, the battery charger circuit 91 comprises a switch configured to be controlled by the microprocessor and to directly convey the current from the photovoltaic panel system or from the set of photovoltaic panels towards the storage apparatus 10.

According to a possible variant, the battery charger circuit 91 comprises a switching circuit, for example of buck converter, a sepic converter or a zeta converter type circuit, etc., configured to be driven by a further PWM signal generated by the microprocessor on the basis of an electric signal arriving from the storage device 10.

According to this variant, the microprocessor can be the same as that exemplified in FIG. 3 and can comprise a further connection and a further suitable programming.

As can be easily understandable by a person skilled in the art, this second embodiment is useful if it is required to ensure greater charging efficiency of the storage device 10.

Advantageously, all the embodiments above disclosed show how the adaptation unit, in fact, supplies the inverter with an output electrical energy similar to that generated by a solar panel system or by a set of photovoltaic solar panels, and makes, in fact, the type of inverter and its characteristics independent from the characteristics of the storage device.

Advantageously, the inverter cannot distinguish whether the energy received arrives from instantaneous solar production, or from production accumulated in the storage device since, as amply disclosed, the adaptation unit is configured to simulate the behavior of any solar panel system or of any set of photovoltaic solar panels.

Operation of the electronic adaptation unit, configured to transfer electric energy from an electrical energy storage device 10 to a converter device or inverter 40 arranged to convert from direct current to alternating current, comprises the steps of:

measuring by way of the sensor 30 the instantaneous electrical energy transmitted by the storage device 10 to the inverter 40 and transmit to the feedback circuit 50 a measured value proportional to the instantaneous electrical energy passing through it, and piloting by way of the feedback circuit 50, depending on the value measured by the sensor 30, a power limiting circuit 20 interposed between the storage device 10 and the converter device 40, by simulating the behavior of a solar panel system or of a set of photovoltaic solar panels.

In particular, the operation of the electronic adaptation unit provides that the step of driving the power limiting circuit 20 by way of the feedback circuit 50 comprises the step of amplifying the signal of the sensor 30 in a linear way and generating a PWM signal at the output arranged for controlling the power limiting circuit 20 to generate at the output a variable voltage within predefined limits, so as to simulate the behavior of a solar panel system or of a set of photovoltaic solar panels.

Of course, obvious changes and/or variations to the above disclosure are possible, as regards components, circuit elements, connections and contacts, as well as details of circuitry, of the described construction and operation method without departing from the scope of the invention as defined by the claims that follow.

The invention claimed is:

1. A system configured to connect an electrical energy storage device (10) comprising certain characteristics to an inverter (40) of certain inverter characteristics, characterized in that it comprises an electronic adaptation unit (100), comprising an input connected to an output of the storage device (10) and an output connected to an input of the inverter (40), said electronic adaptation unit being configured to simulate the behavior of a photovoltaic type solar panel system or of a set of photovoltaic panels so as to make independent the characteristics of the inverter (40) from the characteristics of the storage device (10).

2. The system (5) according to claim 1, further comprising a public electricity network (80) connected, through the inverter (40), to the electronic adaptation unit (100), said electronic adaptation unit (100) being configured to control in a predetermined way the energy to be conveyed to the public electricity network.

3. The system (5) according to claim 2, further comprising a photovoltaic type solar panel system or a set of photovoltaic panels connected, at least through a battery charger circuit (91), to the electronic adaptation unit (100), said electronic adaptation unit (100) being configured to directly convey electrical energy from the photovoltaic type solar panel system or from the set of photovoltaic panels to the storage device (10).

4. The system (5) according to claim 1, further comprising a photovoltaic type solar panel system or a set of photovoltaic panels connected, at least through a battery charger circuit (91), to the electronic adaptation unit (100), said electronic adaptation unit (100) being configured to directly convey electrical energy from the photovoltaic type solar panel system or from the set of photovoltaic panels to the storage device (10).

5. An electronic adaptation unit comprised in the system (5) as claimed in claim 3, characterized in that it comprises
   a power limiting circuit (20) comprising a "buck converter" type circuit connectable by way of a first input (15) to the storage device (10), a feedback circuit (50) cascade connected to a PWM generator (51) and a sensor (30) connectable by way of a first output (45) to the inverter (40),
   wherein the sensor (30) is connected in input to the power limiting circuit (20) and by way of a second output (35) to the feedback circuit (50), the sensor comprising a passive current transformer,
   wherein the feedback circuit (50) comprises a voltage amplifier circuit configured to linearly amplify the signal of the current transformer (30), to limit it, and to make it arranged to drive the PWM generator (51) connected in output to a second input of the power limiting circuit (20), whereby the "buck converter" type circuit comprised in the power limiting circuit (20) is configured to generate a variable voltage output within predefined limits, depending on the driving of the PWM generator (51) so as to simulate the behavior of a solar panel system or of a set of photovoltaic solar panels.

6. An electronic adaptation unit comprised in the system (5) as claimed in claim 3, characterized in that it comprises
   a power limiting circuit (20) comprising a "buck converter" type circuit connectable by way of a first input (15) to the storage device (10), a feedback circuit (50-51) and a sensor (30) connectable by way of a first output (45) to the inverter (40),
   wherein the sensor (30) is connected in input to the power limiting circuit (20) and by way of a second output (35) to the feedback circuit (50-51), the sensor comprising a passive type current transformer,
   wherein the feedback circuit (50-51) is connected to a second input (55) of the power limiting circuit (20) and comprises a digital microprocessor circuit programmed to process the signal of the passive type current transformer (30) and generate in output a PWM signal arranged to control the "buck converter" type circuit, comprised in the power limiting circuit (20), to generate a variable output voltage within predefined limits, depending on the driving operated by the PWM generator (51), so as to simulate the behavior of a solar panel system or of a set of photovoltaic solar panels.

7. An electronic adaptation unit comprised in the system (5) as claimed in claim 3, wherein the system comprises at least one public electricity network (80), characterized in that it comprises
   a power limiting circuit (20) comprising a "buck converter" type circuit connectable by way of a first input (15) to the storage device (10), a feedback circuit (50-51), a first sensor (30) connectable by way of a first output (45) to the inverter (40), and a second sensor (31) connectable to an output (46) of the inverter and to an input of the public electricity network (80),
   wherein the first sensor (30) is connected in input to the power limiting circuit (20) and by way of a second output (35) to the feedback circuit (50-51), the first sensor comprising a passive type current transformer to transmit first values to the feedback circuit (50-51),
   wherein the second sensor (31) is arranged to measure value and direction of electrical energy and is configured to transmit in output to the feedback circuit (50-51), by way of a second input (36) of the feedback circuit (50-51), the value and direction of the electrical energy measured by the second sensor,
   wherein the feedback circuit (50-51) is connected to a second input (55) of the power limiter circuit (20) and comprises a digital microprocessor circuit programmed to combine the values arriving from the first sensor (30) and the value and the direction of the measured electrical energy and to supply in output to the power limiting circuit (20) a PWM signal, configured for controlling the power limiting circuit (20) and for generating in output a voltage variable within predefined limits, depending on the driving operated by the PWM generator (51), so as to simulate the behavior of a solar panel system or of a set of photovoltaic solar panels.

8. A method for controlling by way of an electronic adaptation unit (100) the transfer of electrical energy from an electrical energy storage device (10) to a DC/AC converter or inverter (40), comprising the steps of
   measuring by way of a sensor (30) the instantaneous electrical energy transmitted by the storage apparatus (10) to the inverter (40) and transmitting to a feedback circuit (50) a measured value proportional to the instantaneous electrical energy passing through it,
   driving by way of a feedback circuit (50), as a function of the value measured by the sensor (30), a power limiting circuit (20) interposed between the storage apparatus (10) and the inverter (40), so as to simulate the behavior of a photovoltaic type solar panel system or of a set of photovoltaic solar panels.

9. The method for controlling the transfer of electrical energy from an electrical energy storage apparatus (10) to a DC/AC converter or inverter (40) according to claim 8, wherein the step of driving by way of a feedback circuit (50) a power limiting circuit (20) comprises the step of linearly amplifying the signal of the sensor (30) and outputting a PWM signal arranged for controlling the power limiting circuit (20) to generate a variable voltage output within predefined limits, so as to simulate the behavior of a photovoltaic type solar panel system or of a set of photovoltaic solar panels.

10. An electronic adaptation unit comprised in the system (5) as claimed in claim 3, characterized in that it comprises a power limiting circuit (20) connectable by way of a first input (15) to the storage device (10), a feedback circuit (50) and a sensor (30) connectable by way of a first output (45) to the inverter (40), wherein the sensor (30) is connected in input to the power limiting circuit (20) and by way of a second output (35) to the feedback circuit (50), the sensor being configured to measure the instantaneous electrical energy passing through it and to transmit, to the feedback circuit (50), by way of the second output (35), a measured value, proportional to the instantaneous electrical energy passing through it, wherein the feedback circuit (50) is connected in output to a second input (55) of the power limiting circuit (20) and is configured to drive the power limiting circuit (20) as a function of the measured value, so as to simulate the behavior of a solar panel system or of a set of photovoltaic solar panels.

11. An electronic adaptation unit comprised in the system (5) as claimed in claim 1, characterized in that it comprises a power limiting circuit (20) connectable by way of a first input (15) to the storage device (10), a feedback circuit (50) and a sensor (30) connectable by way of a first output (45) to the inverter (40), wherein the sensor (30) is connected in input to the power limiting circuit (20) and by way of a second output (35) to the feedback circuit (50), the sensor being configured to measure the instantaneous electrical energy passing through it and to transmit, to the feedback circuit (50), by way of the second output (35), a measured value, proportional to the instantaneous electrical energy passing through it, wherein the feedback circuit (50) is connected in output to a second input (55) of the power limiting circuit (20) and is configured to drive the power limiting circuit (20) as a function of the measured value, so as to simulate the behavior of a solar panel system or of a set of photovoltaic solar panels.

12. An electronic adaptation unit comprised in the system (5) as claimed in claim 1, characterized in that it comprises a power limiting circuit (20) comprising a "buck converter" type circuit connectable by way of a first input (15) to the storage device (10), a feedback circuit (50) cascade connected to a PWM generator (51) and a sensor (30) connectable by way of a first output (45) to the inverter (40), wherein the sensor (30) is connected in input to the power limiting circuit (20) and by way of a second output (35) to the feedback circuit (50), the sensor comprising a passive current transformer, wherein the feedback circuit (50) comprises a voltage amplifier circuit configured to linearly amplify the signal of the current transformer (30), to limit it, and to make it arranged to drive the PWM generator (51) connected in output to a second input of the power limiting circuit (20), whereby the "buck converter" type circuit comprised in the power limiting circuit (20) is configured to generate a variable voltage output within predefined limits, depending on the driving of the PWM generator (51) so as to simulate the behavior of a solar panel system or of a set of photovoltaic solar panels.

13. An electronic adaptation unit comprised in the system (5) as claimed in claim 1, characterized in that it comprises a power limiting circuit (20) comprising a "buck converter" type circuit connectable by way of a first input (15) to the storage device (10), a feedback circuit (50-51) and a sensor (30) connectable by way of a first output (45) to the inverter (40), wherein the sensor (30) is connected in input to the power limiting circuit (20) and by way of a second output (35) to the feedback circuit (50-51), the sensor comprising a passive type current transformer, wherein the feedback circuit (50-51) is connected to a second input (55) of the power limiting circuit (20) and comprises a digital microprocessor circuit programmed to process the signal of the passive type current transformer (30) and generate in output a PWM signal arranged to control the "buck converter" type circuit, comprised in the power limiting circuit (20), to generate a variable output voltage within predefined limits, depending on the driving operated by the PWM generator (51), so as to simulate the behavior of a solar panel system or of a set of photovoltaic solar panels.

* * * * *